United States Patent

Takigawa

[11] 4,063,584
[45] Dec. 20, 1977

[54] FLAP FOR RADIAL TIRES

[75] Inventor: Hiroyoshi Takigawa, Higashi-Murayama, Japan

[73] Assignee: Bridgestone Tire Company Limited, Tokyo, Japan

[21] Appl. No.: 661,871

[22] Filed: Feb. 27, 1976

[30] Foreign Application Priority Data

Mar. 8, 1975 Japan .................................. 50-28373

[51] Int. Cl.² .......................... B60B 25/22; B60C 5/16
[52] U.S. Cl. ...................................... 152/365; 152/363
[58] Field of Search ............... 152/365, 366, 363, 349, 152/350

[56] References Cited

U.S. PATENT DOCUMENTS

| | | | |
|---|---|---|---|
| 1,475,147 | 11/1923 | Shively | 152/365 |
| 1,620,818 | 3/1927 | Jacobs | 152/365 |
| 1,658,646 | 2/1928 | Michelin | 152/365 |
| 3,533,461 | 10/1970 | Boileau | 152/365 |

Primary Examiner—Drayton E. Hoffman

Attorney, Agent, or Firm—Sughrue, Rothwell, Mion, Zinn and Macpeak

[57] ABSTRACT

A flap for radial tires which is improved over a conventional flap construction is disclosed. The flap features and employs the following constructional relation between an annular wing portion of the flap and a standard wheel rim.

$$\frac{hw}{hf} = 85\% \text{ to } 105\%$$

In one preferable embodiment, $$\frac{lw}{hf} = 94\% \text{ to } 128\%$$

where $hw$ is a height of the peripheral edge of the annular wing portion of the flap, $hf$ is a height of the flange of the standard wheel rim, and $lw$ is a peripheral length of the annular wing portion of the flap per se from its bottom to its peripheral edge.

3 Claims, 6 Drawing Figures

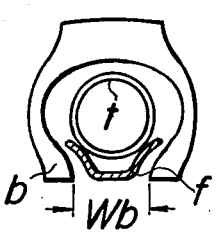
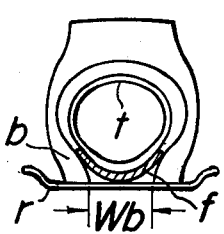
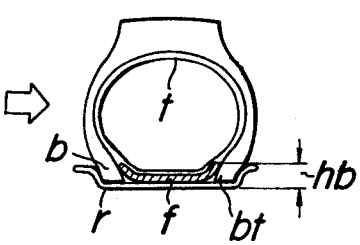
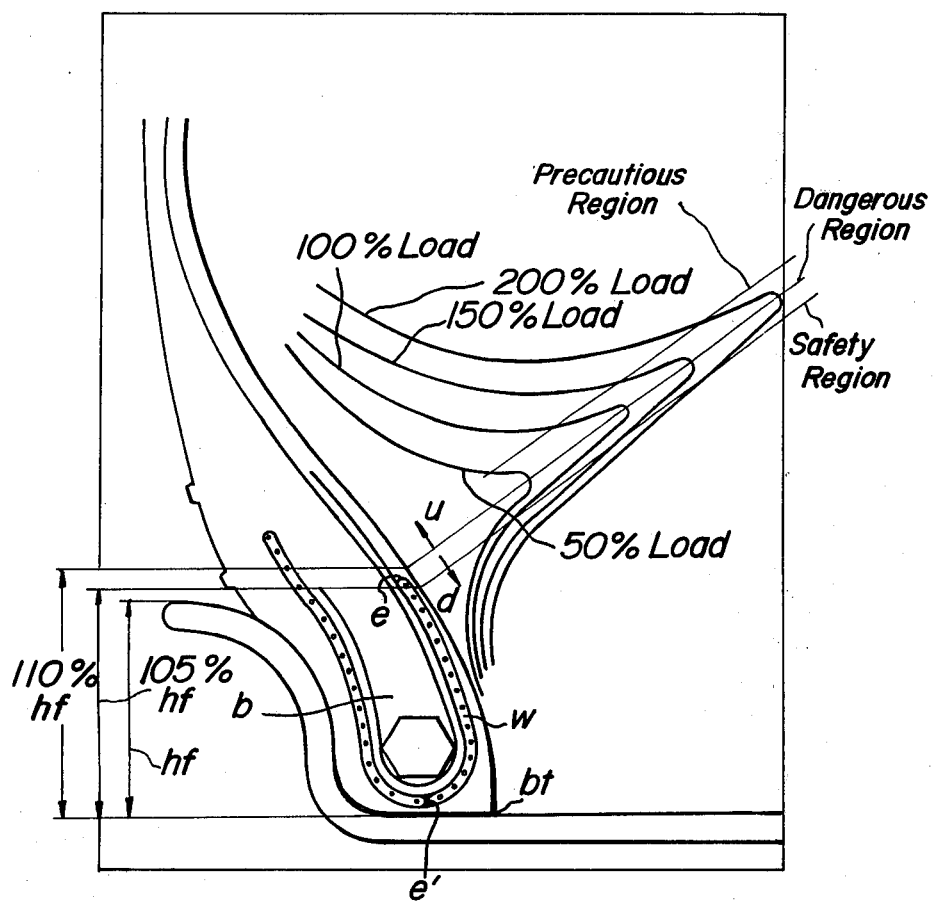

FLAP FOR RADIAL TIRES

This invention relates to improvements in flaps for pneumatic tires and more particularly to improvements in a flap for a radial tire having a radial cord carcass and suitable for large vehicles such as a truck and bus, such flaps being indispensable in eliminating a difficult problem of protecting a tube from its failure due to cracks which have been encountered with conventional flaps.

In general, a flap for a pneumatic tire is composed of a cylindrical base portion located between bead portions of the tire and inserted between a wheel rim and a tube and extending along the outer periphery of the wheel rim. A pair of annular wing portions are made integral with both sides of the cylindrical base portion and are in contact with the inner surfaces of the bead portions, both the cylindrical base portion and the annular wing portions being formed of rubber or rubber-like elastic materials by means of an extrusion, endless bonding or molding operation.

In general, with flaps for pneumatic tires it has been the common practice to determine the dimension of the annular wing portion of the flap in the following manner. The peripheral edge of the annular wing portion on the outer periphery of a standard wheel rim has a height that it is projected beyond the flange of the wheel rim and is inserted between the bead portions and the tube, after the tire has been mounted on the wheel rim and a normal internal pressure has been applied to the tube.

This type of flap applied to a bias tire and more particularly to a bias tire for the above mentioned kind of large vehicles, in which a number of carcass plies are wound around a plurality of bead cores to make the bead portions sufficiently solid, has protected the tube from its failure due to cracks.

Recently radial tires for the above mentioned kind of large vehicles have been developed. In these radial tires, the side portion thereof is considerably deflected in a section containing the rotational axis of the tire to form a stepped portion at a region Z of the tire as shown by dotted lines FIG. 1 due to heavy loads subjected to a wheel since the radial carcass tire uses fewer plies in the side portions of the tire. As a result, that part of a tube $t$ which makes contact with the stepped side portion Z of the tire with the peripheral edge of the wing portion of the flap $f$ inserted therebetween becomes locally and intensely wrinkled during the rotation of the tire under load, Hence the tube $t$ is subjected to a local fatigue in a peripheral direction along the periphery of the wing portion of the flap $f$ to produce cracks thus resulting in a puncture failure of the tire. This problem of protecting the tube has frequently been encountered with the radial tires.

An object of the invention is to provide a flap construction for radial tires which is improved over conventional flap construction.

Another object of the invention is to provide a flap construction for radial tires which features and employs a novel construction relation between a wing portion of the flap and a standard wheel rim.

A further object of the invention is to provide a flap construction for radial tires which is of improved faculty of protecting a tube from its premature failure.

The invention will now be described in greater detail with reference to the accompanying drawings, wherein:

FIGS. 4a, 4b and 4c are cross-sectional views of the bias tire shown in FIG. 2a illustrating successive steps of mounting the bias tire on a standard wheel rim and applying an internal pressure to a tube;

FIG. 5 is a graph which illustrates a distribution of strain that is produced in the inner surface near bead portions of a radial tire for trucks and buses that may be utilized in the practice of the present invention.

Figure 1:
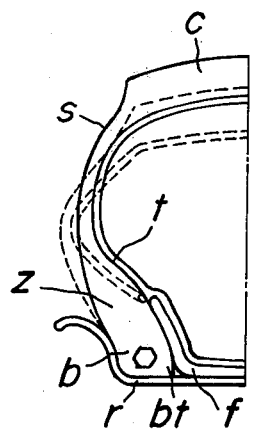
FIG. 1 is a cross-sectional view of one-half of a radial tire showing its deflected state due to heavy load subjected to a wheel.

Referring to FIG. 1, reference letter $c$ designates a crown portion of the tire, $b$ a bead portion, $bt$ a toe of the bead portion, S a side portion and $r$ a standard wheel rim.

The above mentioned tube failure due to local fatigue of the tube $t$ will be described as follows.

Figure 2A:
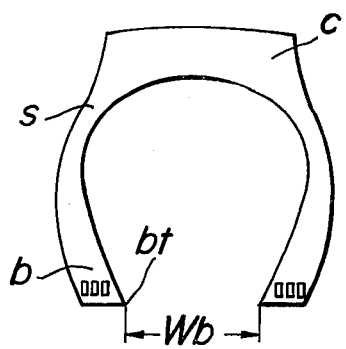
FIG. 2a is a cross-sectional view of a bias tire.
Figure 2B:
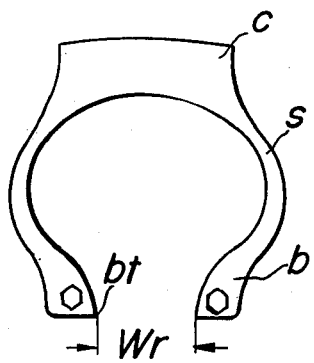
FIG. 2b is a cross-sectional view of a radial tire.
Figure 6:
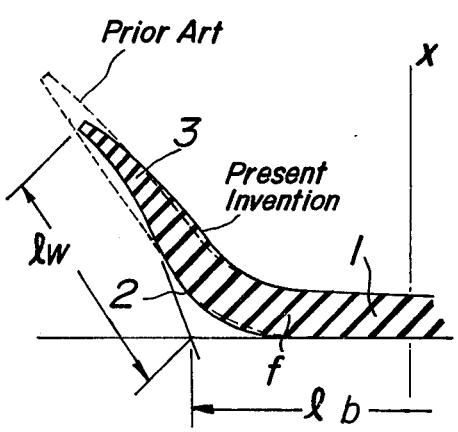
FIG. 6 is a cross-sectional view of a flap according to the invention in an enlarged scale.

In FIG. 2a is shown a cross-sectional view of a bias tire and in FIG. 2b is shown a cross-sectional view of a radial tire having a belt reinforced carcass.

In general, the distance $Wr$ between the two opposed bead portions $b$ of the radial tire shown in FIG. 2b is far narrower than the distance $Wb$ between the two opposed bead portions $b$ of the bias tire shown in FIG. 2a. In addition, the side portions S of the radial tire shown in FIG. 2b are smaller in thickness than in the case of the bias tire shown in FIG. 2a. On the other hand, each of the bead portions $b$ of the radial tire shown in FIG. 2b is provided with a chafer reinforcement (not shown) so as to protect each of the bead portions $b$ from weakening by chafing against the wheel rim. The use of such chafer reinforcement in the bead portions $b$ leads to a projection of the inner surface of the bead portions inwardly with a considerably large curvature contrary to the bead portions $b$ of the bias tire having smooth and continuous inner surface.

Figure 3A:
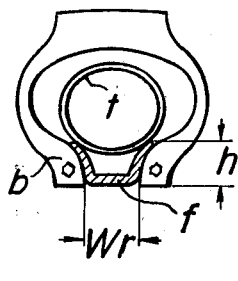
FIGS. 3a, 3b and 3c are cross-sectional views of the radial tire shown in FIG. 2b illustrating successive steps of mounting the radial tire on a standard wheel rim and applying an internal pressure to a tube.
Figure 3B:
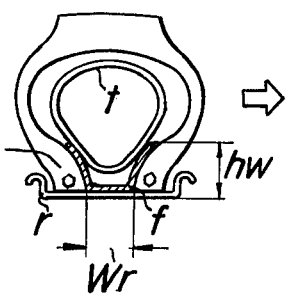
Figure 3C:
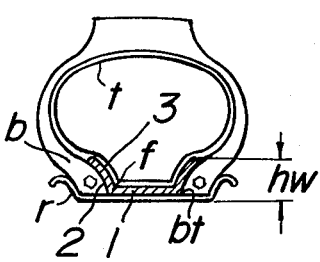

FIGS. 3a, 3b and 3c illustrate successive steps of mounting the radial tire on a standard wheel rim and applying an internal pressure to a tube.

In the case of mounting the tire on the wheel rim, first, the flap $f$ is inserted between the bead portions $b$ and the tube $t$ as shown in FIG. 3a. Then, the assembly is mounted on the wheel rim and internal pressure is applied to the tube. In FIG. 3b the tube is partly pressurized. In FIG. 3a, when the tube $t$ and the flap $f$ are inserted into the tire, the distance between the bead portions is narrower than the rim width, so that the peripheral edge of the wing portion of the flap $f$ is set at a height which is higher than that inherent to the flap $f$ per se (before the flap $f$ is mounted on the rim). In the radial tire, the inner surface of the bead portion is convex inwardly, so that if the internal pressure is applied to the tube $t$ after the assembly shown in FIG. 3a has been mounted on the rim, the wing portion of the flap $f$ is rigidly fastened between the bead portion and the tube under such condition that the above mentioned height is still maintained as shown in FIG. 3b. If the internal pressure is applied to the tube $t$ as shown in FIGS. 3b and 3c, the distance $Wr$ between the two bead portions $b$ becomes enlarged. The increase of the internal pressure causes the cylindrical base portion 1 to stretch in a direction parallel to the rotational axis of the tire, while the wing portions of the flap $f$ are inserted under pressure between the inner surface of the bead portions $b$ and the outer surface of the tube $t$. When the tube $t$ is fully pressurized, the height of the peripheral edge of the wing portion of the flap $f$ shown in FIG. 3c is substantially the same as that shown in FIG. 3b.

In FIGS. 4a, 4b and 4c are illustrated successive steps of mounting the bias tire and the flap on the standard wheel rim and applying the internal pressure to the tube.

In the case of mounting the tire on the wheel rim, first, the cylindrical base portion of the flap $f$ is urged against the outer peripheral surface of the wheel rim $r$ with a considerably large distance $Wb$ maintained between the smooth inner surfaces of the bead portions $b$. Then, the wing portions of the flap $f$ become slidably moved along the bead portions $b$ and are inserted between the tube $t$ and the bead portions $b$ as shown in FIG. 4b.

If the internal pressure is applied to the tube $t$ as shown in FIG. 4c, the wing portions of the flap $f$ are inserted under pressure between the inner surface of the bead portions $b$, $b$ and the outer surface of the tube $t$. The height $hb$ of the peripheral edge of the wing portion of the flap $f$ shown in FIG. 4c is far lower than the height $hw$ in the case of the radial tire shown in FIG. 3c.

As described above, the side portion of the tire located between the flanges of the wheel rim and the shoulder portions of the tread surface becomes considerably deflected during the rotation of the tire under load. As a result, the maximum tensile strain is produced in that inner surface of the tire which is located near the height of the flange of the rim wheel. Since the tube $t$ is in close contact with the tire, if strain is produced in the tire, substantially the same strain is also produced in the tube.

If a flap having a high rigidity is inserted between the tire and the tube and arrives at a region near the flange of the wheel rim, the strain produced in the tire is reduced by the presence of the flap. As a result, the strain produced in the tube at the region where the tube and the flap are overlapped becomes small, while the strain produced in the tire is also produced in the tube at a region where the tire is directly in contact with the tube.

That is, the strain is concentrated into that portion of the tube which is located at the peripheral edge of the wing portion of the flap $f$.

The repeating action of the concentrated strain produced during the rotation of the tire under load is subjected to the tube at the boundary of the above mentioned strain distribution that tends to fatigue the tube and induce premature failure thereof.

FIG. 5 shows a graph which illustrates a distribution of strain that is produced in the inner surface near the bead portions of a radial tire 10.00R20 for trucks and buses that may be utilized in the practice of the present invention. As shown in FIG. 5, the strain produced in the inner surface near the bead portions of the radial tire in the section containing the rotational axis of the tire considerably varies in the tire under load and has a peak value near a position which is 110% of the height $hf$ of the flange of the standard wheel rim.

The absolute value of the strain in a region $u$ located between the 110% $hf$ position and the tread is gradually decreased while maintaining a large strain amplitude caused by the load. Conversely, the absolute value of the strain in a region $d$ located between the 110% $hf$ position and the base of the wheel rim is remarkably decreased while maintaining a small strain amplitude caused by the load.

Here, the strain amplitude
= strain produced in that region of a tire which makes contact with ground at a position directly subjected to the load (the strain is maximum) — strain produced in that region of the tire which is diametrically opposed to the grounded region (the strain is zero).

The larger the strain amplitude the larger the amount of strain during one rotation of the tire must be produced. There has been a tendency for substantially the same strain distribution as that shown in FIG. 5 to be produced in a tire in which the end $e$ of a rubberized chafer $w$ with wires embedded therein and covering the bead portion $b$ terminates at a position $e'$ located directly below the bead portion $b$.

Analytical tests on the mechanism of producing the above mentioned tube failure have resulted in the conclusion that the regions where the tube failure is induced are divided into the following three regions.

1. Dangerous region $$\left(\frac{\text{Height of peripheral edge of wing portion of flap}}{\text{Height of flange of standard wheel rim}} = 105 \text{ to } 140\%\right)$$

If the height of the wing portion of the flap exceeds the height of the flange of the standard rim by 105%, stress is concentrated to the tube thus inducing tube failure due to cracks.

2. Precautious region $$\left(\frac{\text{Height of peripheral edge of wing portion of flap}}{\text{Height of flange of standard wheel rim}} > 140\%\right)$$

If the peripheral edge of the wing portion of the flap becomes higher than 140% of the height of the flange of the standard wheel rim, the stress concentrated to the tube is reduced. But, the strain amplitude during rotation of the tire under load becomes larger, so that there is a risk of the tube being cracked.

3. Safety region $$\left(\frac{\text{Height of peripheral edge of wing portion of flap}}{\text{Height of flange of standard rim wheel}} < 105\%\right).$$

If the height of the peripheral edge of the wing portion of the flap becomes lower than 105% of the height of the flange of the standard rim wheel, the absolute value of the strain becomes remarkably decreased and the strain amplitude during the rotation of the tire under load is also small, so that the tube is protected from cracks.

As described above, heretofore it has been the common practice to arrange the wing portion of the flap along the dangerous region or the precautious region. As a result, in a tire comprising a chafer wound around each of the bead portions, the top end of the inner side leg of the chafer being substantially the same in height as the top end of the flange of the standard wheel rim, the above mentioned tendency of inducing tube failure becomes markedly increased.

A number of running tests have been performed on a large vehicle with radial tires comprising flaps the heights of the top ends of which are different from each other for the purpose of determining the relation between the height of the wing portion of the flap $f$ and the tube failure. The running tests have indicated that a flap whose height of the wing portion lies within the above mentioned safety region does not lead to the tube failure and that a flap whose height of the wing portion lies within the dangerous region or the precautious region frequently induces the tube failure.

As seen from the above, it has been found that if the height of the peripheral edge of the annular wing portion 3 of the flap $f$ is lowered, the tube is protected from being cracked.

However, if the wing height of the flap per se is too low or when the flap is inserted unsymmetrically into the tire by mistake and hence the height of the peripheral edge of the flap $f$ becomes low, the annular wing portion 3 of the flap $f$ is not snugly fitted along the bead portions $b$ of the tire, and as a result, the tube $t$ is engaged between the tire and the wheel rim or between the flap and the tire, thereby inducing tube failure. Experimental tests have shown that if the width of the cylindrical base portion 1 of the flap $f$ is made large, it is possible to alleviate the problem of preventing the flap from being inserted between the tube and the bead portions.

If the width of the cylindrical base portion 1 of the flap $f$ is made too large, however, operation of mounting the flap on the tire becomes difficult. Experimental tests have shown that an optimum ratio of the width of the cylindrical base portion 1 of the flap $f$ to the width of the standard wheel rim is 45% to 50%.

In addition, if the outwardly extending wing portion 3 of the flap $f$ is inclined approximately 65° with respect to the circumferential midline $x$ of the tire, the tire can easily be mounted on the wheel rim. The height of the peripheral edge of the wing portion 3 of the flap $f$ from the toe portion $bt$ of the bead portions $b$ of the flap $f$ is required to be at least 20 mm.

Practical running tests were effected on a tire with a flap according to the invention mounted thereon and a tire with the conventional flap mounted thereon under the following conditions.

Testing conditions:

| | | |
|---|---|---|
| Vehicle tested: | Flat body-2-D4 | |
| Load subjected to vehicle: | Steel product to be transported (200% Load) | |
| Tire used: | 100 R 20 14PR: (steel radial tire for trucks and buses) | |

One example of the test results produced the following data:

| | Items | Flap according to the invention | Conventional flap | Flap tested | | |
|---|---|---|---|---|---|---|
| Flaps tested | Height of peripheral edge of wing portion hw(mm) | 46 | 62 | 46 | 36 | 52 |
| | Wing angle α | 65° | 55° | 55° | 55° | 55° |
| | Width of base portion lb(mm) | 86 | 82 | 82 | 82 | 67 |
| | Periphery P(mm) | 180 | 205 | 175 | 155 | 172 |
| | lw/hf | 1.03 | 1.39 | 1.03 | 0.81 | 1.17 |
| Result | Tube failure | ○ | × | ○ | △ | △ |

○ : No problem
△ : Cautious
× : Dangerous

In accordance with this invention, it is preferable to define the ration $lw/hf$ by 94% to 128%. If the ratio $lw/hf$ is smaller than 94%, there is a risk of the unsymmetrical insertion of the flap per se or the engagement of the tube between the tire and the wheel rim or between the flap and the tire. On the contrary, if the ratio $lw/hf$ is larger than 128%, the peripheral edge of the wing portion of the flap per se is brought into the dangerous region in FIG. 5 in which tube failure is liable to occur.

As stated hereinbefore, the invention is capable of eliminating a difficult problem which has been encountered with radial tires which tend to fatigue the tube by rubbing it against the peripheral edge of a wing portion of a flap due to the use of fewer plies in the side portions of the tire and the greater flexibility of the side portions than in the case of carcass tires and of fully protecting the tube from contact with the wheel rim.

What is claimed is:

1. A flap for radial tires comprising, a cylindrical base portion along the outer periphery of a standard wheel rim and between a pair of bead portions of a tire to be mounted on said wheel rim with a tube inside the tire, and a pair of annular wing portions, said cylindrical base portion having a width from 45% to 50% of said wheel rim and adapted to be expanded with expansions of said tube by inflation pressure, each wing portion having a bent portion contacting a toe of each of said bead portions and integral with each side of said cylindrical base portion and extending from said bent portion for insertion between the inner surface of said bead portions of the tire and the tube inside the tire, a ratio of a height $hw$ of the peripheral edge of said wing portion measured from the outer periphery of said wheel rim to a height $hf$ of the flange of said wheel rim being in the range of 85% to 105%, a ratio of a peripheral length $lw$ of said annular wing portion of the flap per se from its bottom to its peripheral edge to said height $hf$ of the flange of said wheel rim being in the range of 94% to 128%.

2. A flap for radial tires as claimed in claim 1, wherein the outwardly extending wing portion of said flap is inclined approximately 65° with respect to the circumferential midline of the tire.

3. A flap for radial tires as claimed in claim 1, wherein the height of the peripheral edge of the wing portion of said flap is at least 20 mm.

* * * * *